United States Patent
Nelson et al.

(10) Patent No.: US 9,811,953 B2
(45) Date of Patent: Nov. 7, 2017

(54) SYSTEM AND METHOD FOR MONITORING PRODUCTIVITY OF A PAVING MACHINE

(71) Applicant: Caterpillar Paving Products Inc., Brooklyn Park, MN (US)

(72) Inventors: Ryan J. Nelson, Maple Grove, MN (US); Toby A. Frelich, Saint Michael, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 58 days.

(21) Appl. No.: 15/079,229

(22) Filed: Mar. 24, 2016

(65) Prior Publication Data

US 2017/0278322 A1 Sep. 28, 2017

(51) Int. Cl.
*G07C 5/08* (2006.01)
*E01C 19/48* (2006.01)
*G01G 19/08* (2006.01)

(52) U.S. Cl.
CPC ............ *G07C 5/0841* (2013.01); *E01C 19/48* (2013.01); *G01G 19/08* (2013.01); *G07C 5/0816* (2013.01)

(58) Field of Classification Search
CPC ..... E01C 2019/1081; E01C 2019/2055; E01C 2019/2065; E01C 19/02; E01C 19/1059; E01C 19/12; E01C 19/20
USPC ............................................... 404/84.05, 108
See application file for complete search history.

(56) References Cited

U.S. PATENT DOCUMENTS

| | | | | |
|---|---|---|---|---|
| 3,967,912 A | * | 7/1976 | Parker | E01C 19/4873 404/108 |
| 4,011,023 A | * | 3/1977 | Cutler | E01C 23/065 404/77 |
| 5,044,819 A | | 9/1991 | Kilheffer et al. | |
| 5,356,238 A | * | 10/1994 | Musil | E01C 19/008 404/101 |
| 5,590,976 A | | 1/1997 | Kilheffer et al. | |
| 6,244,782 B1 | | 6/2001 | Bitelli | |
| 7,172,363 B2 | * | 2/2007 | Olson | E01C 19/48 404/118 |
| 8,930,092 B2 | | 1/2015 | Minich | |
| 9,180,605 B2 | | 11/2015 | Long | |
| 9,428,869 B2 | * | 8/2016 | Pedersen | E01C 23/07 |
| 9,637,872 B1 | * | 5/2017 | Pedersen | E01C 15/00 |
| 2004/0002789 A1 | * | 1/2004 | Hachtel | G01G 11/086 700/241 |
| 2007/0226089 A1 | | 9/2007 | DeGaray et al. | |
| 2014/0262548 A1 | | 9/2014 | Acheson et al. | |
| 2015/0247294 A1 | | 9/2015 | Weiler et al. | |
| 2017/0030027 A1 | * | 2/2017 | Frelich | E01C 19/002 |
| 2017/0030030 A1 | * | 2/2017 | Frelich | E01C 7/00 |

* cited by examiner

*Primary Examiner* — Gary Hartmann

(57) ABSTRACT

A method of monitoring a productivity of a paving machine. The method includes receiving a signal, through a load monitoring device, indicative of a change in a load on a frame of the paving machine. The method also includes determining a sum value of the change in the load on the frame based on the signal received each time when a material is delivered to the paving machine, and when the signal indicates an increase in the load on the frame. The method further includes determining a weight of the material provided to the paving machine based on at least the sum value of the change in the load.

20 Claims, 3 Drawing Sheets

SYSTEM AND METHOD FOR MONITORING PRODUCTIVITY OF A PAVING MACHINE

TECHNICAL FIELD

The present disclosure generally relates generally to a paving machine. More particularly, the present disclosure relates to a system and a method for monitoring productivity of the paving machine.

BACKGROUND

Paving machines are used to apply, spread, and compact a mat of paving material over a paving surface. A paving machine generally includes a tractor and a screed assembly. The tractor has a hopper for receiving asphalt material from a truck and a conveyor system for transferring the asphalt rearwardly from the hopper for discharge onto the paving surface. The paving machine includes augers to spread the asphalt across the paving surface in front of the screed assembly. The screed assembly smoothens and compacts the asphalt material on the paving surface. The operators or other personnel requires to keep a track of the amount of material received by the paving machine or discharged from the paving machine over a time period in order to determine a productivity of the paving machine.

Currently, the operators rely on manual weight tickets to keep track of the material tonnage processed by the paving machine. However, such a method may not be as efficient and easy to implement to determine if a correct amount of material is being supplied to the paving machine, based on the required application. Additionally, a density of the paving material may change based on a temperature and other factors and thus, calculation of the weight using predefined density values may also not be accurate.

U.S. Pat. No. 6,244,782 is related to a finishing machine for the laying of the asphalt surface. The machine has a conveyer, and a hopper for the storage and the distribution of material. The conveyer, that moves material from the hopper to the auger, has a couple of chains connected with one another by transversal splines that are suitable for the transport of the material. The material crawls on a plurality of fixed plates secured to the frame of the machine, and the chains run on the plates. The last plate, which supports the passing material, is floating in comparison with the fixed plate which precedes it. The last plate is on a weighing device, and the device is connected with a control power unit. The control power unit detects a signal relevant to the reading of the weight of the material. The signals are detected at time intervals, depending on the angular speed of the hopper, and allows weighing to take place after all the weighed material has been unloaded from the weighing plate.

SUMMARY OF THE DISCLOSURE

In an aspect of the present disclosure, a system for monitoring a productivity of a paving machine is provided. The system includes a load monitoring device located on a mount between a traction device and a frame of the paving machine. The load monitoring device is configured to provide a signal indicative of a change in a load on the frame of the paving machine. The system also includes a controller communicably coupled to the load measuring device. The controller is configured to receive the signal indicative of the change in the load on the frame. The controller is also configured to determine a sum value of the change in the load on the frame based on the signal received each time when a material is delivered to the paving machine. The signal used to determine sum indicates an increase in the load on the frame. The controller is further configured to determine a weight of the material provided to the paving machine based on at least the sum value of the change in the load.

In another aspect of the present disclosure, a method of monitoring a productivity of a paving machine is provided. The method includes receiving a signal, through a load monitoring device, indicative of a change in a load on a frame of the paving machine. The method also includes determining a sum value of the change in the load on the frame based on the signal received each time when a material is delivered to the paving machine, wherein the signal indicates an increase in the load on the frame. The method further includes determining a weight of the material provided to the paving machine based on at least the sum value of the change in the load.

In yet another aspect of the present disclosure, a paving machine is provided. The paving machine includes a frame and a hopper configured to receive a material therein. The paving machine also includes a load monitoring device located on a mount between a traction device and a frame of the paving machine. The load monitoring device is configured to provide a signal indicative of a change in a load on the frame of the paving machine. The paving machine also includes a controller communicably coupled to the load measuring device. The controller is configured to receive the signal indicative of the change in the load on the frame. The controller is also configured to determine a sum value of the change in the load on the frame based on the signal received each time when a material is delivered to the paving machine. The signal used to determine sum indicates an increase in the load on the frame. The controller is further configured to determine a weight of the material provided to the paving machine based on at least the sum value of the change in the load.

Other features and aspects of this disclosure will be apparent from the following description and the accompanying drawings.

BRIEF DESCRIPTION OF THE DRAWINGS

The features and advantages of the present disclosure will become more apparent from the detailed description set forth below when taken in conjunction with the drawings.

DETAILED DESCRIPTION

Figure 1:
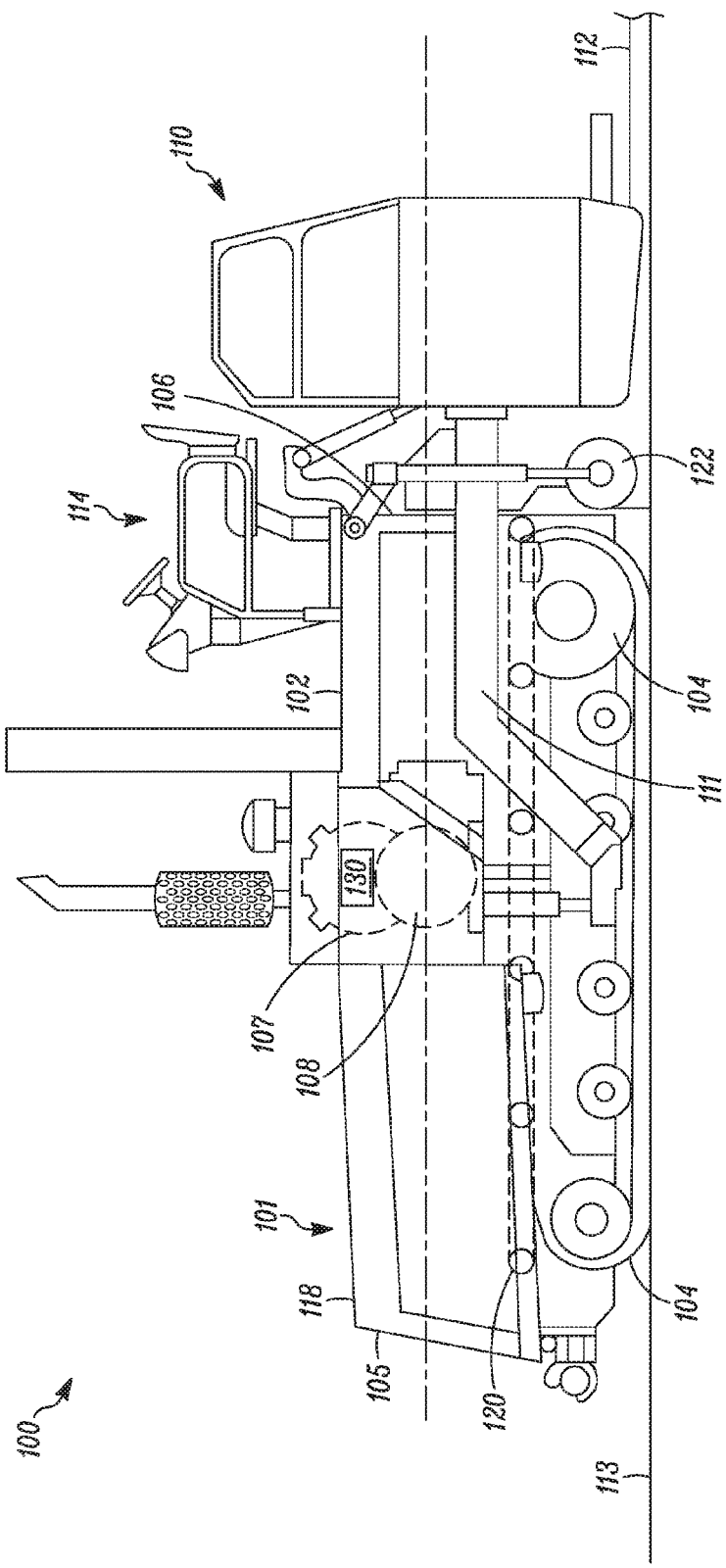
FIG. 1 is a side view of an exemplary paving machine, according to an embodiment of the present disclosure.

Wherever possible, the same reference numbers will be used throughout the drawings to refer to the same or the like parts. Referring to FIG. 1, an exemplary paving machine 100 (hereinafter referred to as "the machine 100") is illustrated. Although, the paving machine 100 is depicted in the figures as an asphalt paver, the presently disclosed concepts may be used on any kind of a paving machine and for any kind of material engaging operation performed by the work surface machine, that may form a layer of material on a paving surface. Exemplary paving materials for which the disclosed concepts may be used include asphalt, concrete, and loose aggregate materials such as crushed gravel and the like.

As shown in FIG. 1, the machine 100 includes a tractor 101 having a frame 102. The machine 100 also includes one or more traction devices 104 coupled with the frame 102 having a front end 105 and a rear end 106. In the illustrated embodiment, the traction devices 104 includes wheels. However, in various alternative embodiments, the traction devices 104 may include other types of ground engaging members such as bogies, tracks and the like. Further, the traction devices 104 could also include different combinations of the ground engaging members. For example, the paving machine 100 may include a combination of wheels and tracks.

The traction device 104 may be driven by a power source, e.g., an engine 107 via a transmission (not shown). The transmission may be a hydrostatic transmission or a mechanical transmission. The engine 107 may further drive an associated generator 108 that is used to power various system on the machine 100.

The paving machine 100 also includes a screed assembly 110 that is coupled to the tractor 101 and attached at the rear end 106 of the frame 102. The screed assembly 110 is configured to spread and compact a material into a layer or mat 112 of desired thickness, size and uniformity on a ground surface 113. The screed assembly 110 may be any of a number of configurations known in the art such as, a fixed width screed, a rear mount extendible screed, a front mount extendible screed, or a multiple section screed that includes extensions. In an embodiment, the screed assembly 110 may be a multiple section screed including a main screed section (not shown) and extender screed sections (not shown) located on both sides of the main screed section. The extender screed sections may be individually adjustable with respect to the main screed section to allow for varying widths and crowning of the ground surface 113.

The screed assembly 110 may be connected behind the machine 100 by a pair of tow arms 111 (only one of which is visible in FIG. 1) that may extend between the frame 102 of the machine 100 and the screed assembly 110. The tow arms 111 are pivotally connected to the frame 102 such that the relative position and orientation of the screed assembly 110 relative to the frame 102, and the ground surface 113, may be adjusted by pivoting the tow arms 111 in order, for example, to control a thickness 'T' of the paving material deposited on the ground surface 113.

The screed assembly 110 may also be powered by the generator 108 or the engine 107. The generator 108 may be used to power multiple components associated with the screed assembly 110, for example, electric heating elements (not shown), crown actuators (not shown) etc.

The machine 100 may also include an operator station 114, which may include various controls for directing operations of the machine 100. The operator station 114 may also include a user interface (not shown) for accepting user input and displaying information to the operator. The user interface may have a combination of buttons, switches, dials, levers, touch screens and other control devices that may allow the operator to input commands for controlling various components of the machine 100.

The machine 100 further includes a hopper 118 configured to receive and store a material. The machine 100 may include a conveyor system including one or more conveyors 120 configured to move the material from the hopper 118 to the rear end 106 of the frame 102. The conveyors 120 are arranged at a bottom of the hopper 118 and, if more than one is provided, may be positioned side-by-side and run parallel to one another to the rear end 106 of the frame 102. The speed of the one or more conveyors 120 is adjustable in order to control the rate at which paving material may be delivered to the screed assembly 110. In case more than one conveyor 120 is provided, the speed of each of the conveyors 120 may be independently variable in order to adjust the amount of paving material delivered to each side of the screed assembly 110.

The machine 100 also includes an auger 122 coupled to the tractor 101 and located between the tractor 101 and the screed assembly 110. The auger 122 may be placed at the rear end 106 of the frame 102 and adjacent to the screed assembly 110. The auger 122 is configured to receive the paving material supplied by the conveyors 120 and spread the material evenly ahead of the screed assembly 110. In an example, the auger 122 may be a screw auger 122. The machine 100 may have a single auger 122 or any number of augers 122.

The paving machine 100 may be configured to work in multiple mode of operations. In one embodiment, the paving machine 100 may perform in a first mode of operation, during which, the hopper 118 may receive and store the material. Additionally, the paving machine 100 may be configured to perform in a second mode of operation, during which, the material may be discharged from the paving machine 100. Moreover, the material may be discharged from the rear end 106 and further laid on to the ground surface 113. As discussed above, the conveyors 120 may be configured to move the paving material from the hopper 118 to the rear end 106 of the frame 102. The auger 122 may be configured to receive the paving material supplied by the conveyors 120 and spread the material ahead of the screed assembly 110. Further, the screed assembly 110 may be configured to spread and compact paving material into a layer of desired thickness 'T', size and uniformity on the ground surface 113.

In another embodiment, the paving machine 100 may be configured to perform in a third mode of operation, during which, the material may be discharged from the paving machine 100 at the same time as the material is being received in the hopper 118. The rate at which the material is received may be either different or equal to a rate at which the material is discharged based on one or more pre-defined settings for the machine 100.

In various embodiments of the present disclosure, the paving machine 100 may be configured to perform in one or more of the first mode of operation, the second mode of operation and the third mode of operation in different cycles or as needed as per the application. Other configurations of the paving machine 100 for receiving the material and discharging the material may also be contemplated as per the present disclosure.

Figure 2:
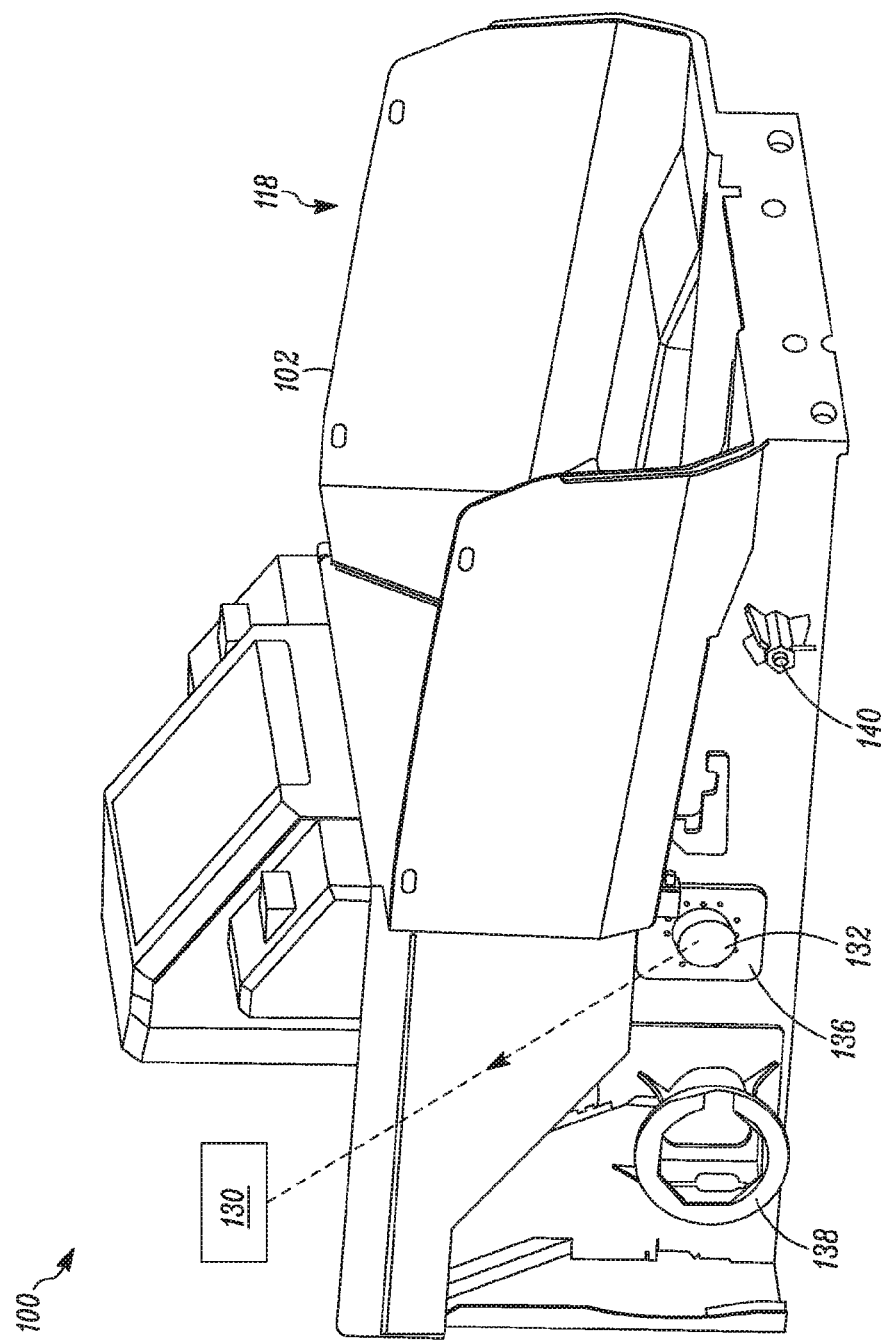
FIG. 2 is a partial perspective view of the paving machine having a load monitoring device, according to an embodiment of the present disclosure.

Referring to FIG. 1 and FIG. 2, the paving machine 100 includes a controller 130 that is configured to monitor a productivity of the paving machine 100. In one embodiment, the productivity may include a weight 'W1' of the material that is delivered to the hopper 118 over a period of time. The productivity may also include a weight of the material that is discharged from the paving machine 100 over the time period. The controller 130 may be configured to determine these values related to the productivity of the machine 100. In another embodiment, the controller 130 may also be configured to determine a density 'D' of the material.

As shown in the FIG. 2, the controller 130 is communicably coupled to a load monitoring device 132. The load monitoring device 132 may be configured to provide a signal indicative of a change in a load on the frame 102. In an embodiment, the load monitoring device 132 may be a radial load cell. The load monitoring device 132 is located between the traction device 104 and the frame 102. In the illustrated embodiment, the load monitoring device 132 is installed on a mount 136 disposed between the traction device 104 and the frame 102. In other embodiments, the load monitoring device 132 may be installed on any one of the other mounts 138, 140.

Though only one load monitoring device 132 is illustrated in FIG. 2, it may be possible that multiple such load monitoring devices 132 are located across a width of the frame 102. For example, the load monitoring devices 132 may disposed on each of the mounts 136, 138, 140. Though the load monitoring device 132 is illustrated as being installed on the mount 136, it may be envisioned to provide the load monitoring device 132 at any alternative location on the machine 100 to enable measuring of a change in load on the machine 100. Further, the load monitoring device 132 may be encased inside a housing (not shown) to protect internal components from any foreign particles.

The controller 130 may be communicably coupled, and configured to receive signals from the load monitoring device 132. Communication between the controller 130 and the other electrical components such as the load monitoring device 132 may be established by sending and receiving digital or analog signals across electronic communication lines or communication busses, including by wireless communication.

In an embodiment, the controller 130 is an electronic control module (ECM) associated with the engine 107. The controller 130 may include a microprocessor, an application specific integrated circuit ("ASIC"), or other appropriate circuitry and may have a memory or other data storage capabilities. The controller 130 may include functions, steps, routines, data tables, data maps, charts and the like saved in and executable from read only memory to monitor the productivity of the paving machine 100.

Although in FIG. 1 and FIG. 2, the controller 130 is illustrated as a single, discrete unit, in other embodiments the controller 130 and its functions may be distributed among multiple distinct and separate components. Further, in addition to the components illustrated in FIG. 1 and FIG. 2, the controller 130 may also be operatively associated with various other components of the machine 100, such as with the screed assembly 110.

The controller 130 may receive signals indicative of a change in a load on the paving machine 100 from the load monitoring device 132. In an embodiment, the controller 130 may receive signals from multiple load monitoring devices 132 and compare readings of the load monitoring devices 132 to eliminate any false readings and detect any malfunction of the corresponding load monitoring devices 132. In another embodiment, the controller 130 may determine a mode among the received readings and use the mode for future calculations. In yet another embodiment, the controller 130 may determine an average of the readings received from the multiple load monitoring devices 132.

The change in a load on the frame 102 due to loading and discharge of the material may generally occur during the first mode of operation, second mode of operation and the third mode of operation. In an embodiment, the controller 130 may also be configured to identify if the paving machine 100 is performing the first mode of operation, the second mode of operation or the third mode of operation.

Accordingly, the controller 130 is also configured to determine a sum value 'SV' of the change in the load on the frame 102 based on the signal received each time when a material is delivered to the paving machine 100, while the signal indicates an increase in the load on the frame 102. More specifically, if the paving machine 100 is performing one of the first mode of operation or the third mode of operation, the controller 130 may determine the sum value 'SV' of the change in the load based on all those signals, from the load monitoring device 132, that indicate an increase in the load on the frame 102.

In one embodiment, the paving machine 100 may perform just the first and second mode of operations and not the third mode of operation for loading and discharging the material. In such a case, the controller 130 may determine the weight 'W1' of the material being provided to the paving machine 100 over a time period based on the sum value 'SV' determined during that time period. In one embodiment, the weight 'W1' of the material provided to the paving machine 100 may be equal to the sum value 'SV' determined over the corresponding time period. In another embodiment, the weight 'W1' of the material provided to the paving machine 100 may be determined based on the sum value 'SV' and a scale factor of the load monitoring device 132.

In another embodiment, the paving machine 100 may perform the third mode of operation for at least a certain time period. During that time period, the controller 130 may determine the sum value 'SV' based on all the signals that indicate an increase in the load on the frame 102 and may ignore the signals that indicate a decrease in the load on the frame 102. For example, during the third mode of operation, in some cases, a discharge rate of material may be greater than a rate of supply of the material to the hopper 118. In such cases, the signals from the load monitoring devices 132 may indicate a decrease in load, and the controller 130 is configured to ignore such signals from the load monitoring device 132 that indicate a decrease in the load on the frame 102. The controller 130 may also be configured to determine a weight 'W2' of the material being discharged from the paving machine 100 onto the ground surface 113 during the third mode of operation. Accordingly, the controller 130 may determine the weight 'W1' of the material provided to the paving machine 100 over a time period based on the sum value 'SV' and taking into account the weight 'W2' of the material being discharged.

In an embodiment, the controller 130 may determine the weight 'W2' of the material being discharged during the third mode of operation based at least on a speed 'S' of the machine 100, and an area 'A1' of the ground surface 113 that is being laid with the material. In an example, the controller 130 may be communicably coupled to a speed sensor (not shown) to determine the speed 'S' of the machine 100. The controller 130 may also determine the thickness 'T' of the mat 112 laid over the ground surface 113. In an embodiment, the thickness 'T' of the mat 112 may be predefined for a specific application of the paving machine 100, and alternatively, the screed assembly 110 is configured to send a signal, indicative of the thickness 'T' of the mat 112, to the controller 130. Further, the controller 130 may determine a volume 'V1' of the material laid during the third mode of operation based on the area 'A1', the speed 'S' and the thickness 'T'.

The controller 130 may also determine the density 'D' of the material for use in calculating the weight 'W2' of the material discharged over a time period during the third mode of operation. In one embodiment, the controller 130 may retrieve the density 'D' from a memory (not shown) associated therewith.

In another embodiment, the controller 130 may determine the density 'D' based at least on the speed 'S' of the machine 100, an area 'A2' of the ground surface 113 being laid with the material, the thickness 'T' of the mat 112 and the signal received from the load monitoring device 132 during the second mode of operation (while the material is not being delivered to the paving machine 100) of the paving machine 100. The signal received from the load monitoring device 132 during the second mode of operation indicates a decrease in the load which in turn indicates a weight 'W3' of the material discharged from the paving machine 100. The controller 130 may determine the density 'D' based at least from the below equation (1):

$$W3 = V2 * D * g \qquad (1)$$

wherein W3 is the weight of the material discharged during the second operation over a time period;
V2 is a volume of the material laid on the ground surface 113 during the second operation;
D is the density of the material; and
g is acceleration due to gravity.

The controller 130 may determine the weight 'W3' of the material discharged based on the signal received from the load monitoring device 132 during the second mode of operation over the time period. The volume 'V2' of the material laid over the ground surface 113 over the time period during the second mode of operation may be calculated based on the speed 'S', the area 'A2' on the ground surface 113 and the thickness 'T' of the mat 112.

Similarly, as discussed above, the controller 130 may determine the weight 'W2' of material discharged during the third mode of operation based on the density 'D', and a volume 'V1' of the material laid on the ground surface 113. The volume 'V1' laid during the third mode of operation over the time period may be determined based on the corresponding speed 'S', the area 'A1' and the thickness 'T' of the mat 112. Further, during the third mode of operation, the controller 130 may determine the weight 'W1' of the material provided to the machine 100 as the summation of the weight 'W2' of the material discharged and the sum value 'SV'.

It should be noted that one or more of the parameters such as, the area 'A1', the thickness 'T' and the speed 'S' during the third operation may be either equal to different from the area 'A2', the thickness 'T' and the speed 'S' during the second mode of operation.

In an embodiment, the controller 130 may store the information indicative of the productivity in a memory. Additionally, or optionally, the controller 130 may communicate the information regarding the productivity of the paving machine 100 to an operator, or some remote personnel equipped with a computer or a mobile device.

INDUSTRIAL APPLICABILITY

With use and implementation of the system of the present disclosure, the weight of the material delivered to the hopper 118 over a period of time may be determined. Further, the weight of the material that is discharged from the paving machine 100 over the time period system may also be determined.

Figure 3:
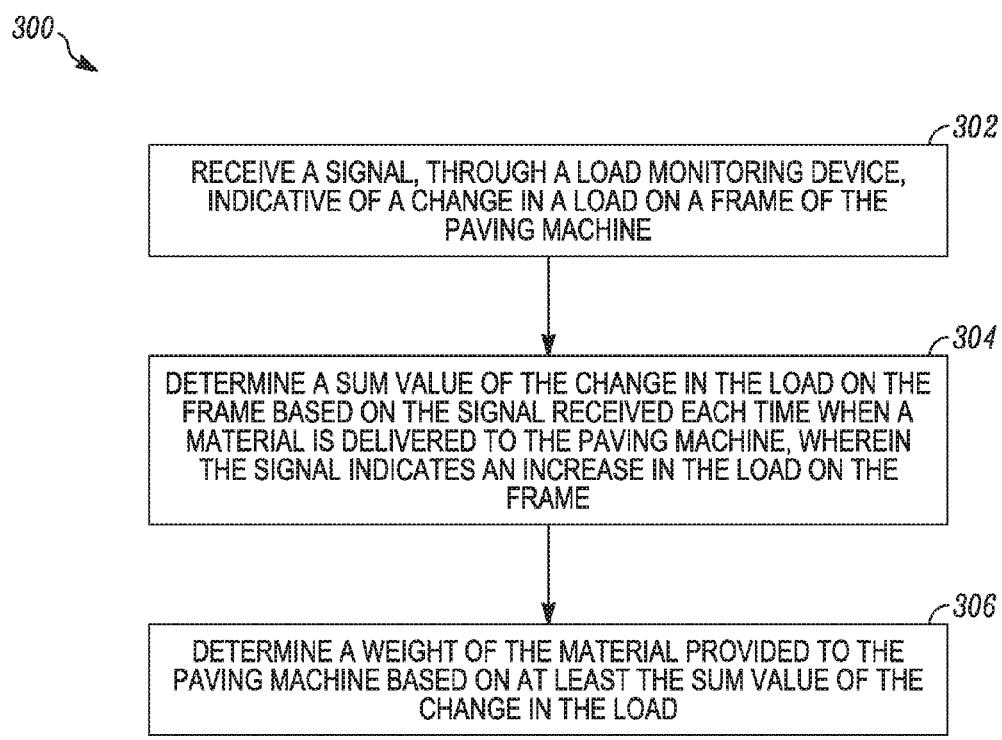
FIG. 3 is a flowchart for a method of monitoring a productivity of the paving machine, according to an embodiment of the present disclosure.

Referring to FIG. 3, the present disclosure is also related to a method 300 of monitoring a productivity of the paving machine 100. The method 300 will be explained hereinafter in conjunction with the paving machine 100, however, it may be contemplated to implement the concepts of the method 300 to any other work surface machine, that may form a layer of material on a paving surface.

At step 302, the method 300 includes, receiving a signal, through the load monitoring device 132, indicative of a change in a load on the frame 102 of the paving machine 100. The load monitoring device 132 may be disposed on one of the mounts 136, 138, 140 between the frame 102 and the traction device 104.

At step 304, the method 300 includes determining the sum value 'SV' of the change in the load on the frame 102 based on the signal received each time when a material is delivered to the paving machine 100, and when the signal indicates an increase in the load on the frame 102.

At step 306, the method 200 includes determining the weight 'W1' of the material provided to the paving machine 100 based on at least the sum value 'SV' of the change in the load. In one embodiment, the weight 'W1' of the material provided may be equal to the sum value 'SV'. In another embodiment, if the machine 100 is performing third operation, the weight 'W1' of the material may be a summation of the sum value 'SV' and the weight 'W2' of the material discharged during the third operation.

The method 300 may also include determining the density 'D' of the material based on signal received during the second operation, the speed 'S', and the area 'A2' laid during the second operation. The determined density 'D' may be used in other calculations such as the weight 'W2' of the material being discharged during the third operation. Further, using the determined density 'D' and the reading from the load monitoring device 132 increases the accuracy in calculation of the weight 'W1' of the material provided to the paving machine 100.

The method 300 may further include communicating the information regarding the productivity to the operator or other devices remotely located from the paving machine 100. The information can also be transmitted and viewed by plant personnel and drivers to ensure the correct amount of material is delivered to the machine 100 at all times.

In addition, calculation of the amount of material laid using the speed and the area laid can be calibrated using the direct measurement by the load monitoring device 132 during the second mode of operation. Further, the density of the material may also be determined. This calibration can be used to more accurately make the weight correction that is needed during the third mode of operation i.e., when the material is being laid and received at the same time. The calibration is also made as seamless and easy as possible to the operator. Further, the calibration may be performed by the controller 130 automatically at a certain time or distance interval without the operator having to trigger the calibration.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:
1. A system for monitoring a productivity of a paving machine, the system comprising:
a load monitoring device located on a mount between a traction device and a frame of the paving machine, wherein the load monitoring device is configured to provide a signal indicative of a change in a load on the frame of the paving machine; and a controller communicably coupled to the load measuring device, the controller configured to:
receive the signal indicative of the change in the load on the frame;
determine a sum value of the change in the load on the frame based on the signal received each time when a material is delivered to the paving machine, wherein the signal indicates an increase in the load on the frame; and
determine a weight of the material provided to the paving machine based on at least the sum value of the change in the load.

2. The system of claim 1, wherein the controller is further configured to determine a weight of the material being discharged from the paving machine onto a ground surface.

3. The system of claim 2, wherein the controller is further configured to account in the weight of the material being discharged onto the ground surface, while the material is being delivered to the paving machine, to determine the weight of the material provided to the paving machine.

4. The system of claim 3, wherein the weight of material provided to the paving machine is a summation of the determined sum value of the change in the load and the weight of material being discharged from the paving machine.

5. The system of claim 2, wherein the weight of the material being discharged from the paving machine is determined based at least on a speed of the paving machine, and an area of the ground surface being laid with the material.

6. The system of claim 1, wherein the controller is further configured to determine a density of the material based at least on a speed of the machine, an area of a ground surface being laid with the material, one or more operational parameters of the paving machine and the signal received from the load monitoring device while the material is not being delivered to the paving machine.

7. The system of claim 1, wherein the load monitoring device is a radial load cell.

8. A method of monitoring a productivity of a paving machine, the method comprising:
receiving a signal, through a load monitoring device, indicative of a change in a load on a frame of the paving machine;
determining a sum value of the change in the load on the frame based on the signal received each time when a material is delivered to the paving machine, wherein the signal indicates an increase in the load on the frame; and
determining a weight of the material provided to the paving machine based on at least the sum value of the change in the load.

9. The method of claim 8 further comprising determining a weight of the material being discharged from the paving machine onto a ground surface.

10. The method of claim 9 further comprising accounting in the weight of the material being discharged onto the ground surface, while the material is being delivered to the paving machine, to determine the weight of the material provided to the paving machine.

11. The method of claim 10, wherein the weight of material provided to the paving machine is a summation of the determined sum value of the change in the load and the weight of material being discharged from the paving machine.

12. The method of claim 11, wherein the weight of the material being discharged from the paving machine is determined based at least on a speed of the paving machine, and an area of the ground surface being laid with the material.

13. The method of claim 8 further comprising determining a density of the material based at least on a speed of the machine, an area of a ground surface being laid with the material, one or more operational parameters of the paving machine, and the signal received from the load monitoring device while the material is not being delivered to the paving machine.

14. The method of claim 8 further comprising communicating the productivity of the paving machine to one or more personnel.

15. A paving machine comprising:
a frame;
a hopper configured to receive a material therein;
a load monitoring device located on a mount between a traction device and the frame, the load monitoring device configured to provide a signal indicative of a change in a load on the frame of the paving machine; and
a controller communicably coupled to the load measuring device, the controller configured to:
receive the signal indicative of the change in the load on the frame;
determine a sum value of the change in the load on the frame based on the signal received each time when the material is delivered to the paving machine, wherein the signal indicates an increase in the load on the frame; and
determine a weight of the material provided to the paving machine based on at least the sum value of the change in the load.

16. The paving machine of claim 14, wherein the controller is further configured to determine a weight of the material being discharged from the paving machine onto a ground surface based at least on a speed of the paving machine, and an area of the ground surface being laid with the material.

17. The paving machine of claim 15, wherein the controller is further configured to account in the weight of the material being discharged onto the ground surface, while the material is being delivered to the paving machine, to determine the weight of the material provided to the paving machine.

18. The paving machine of claim 16, wherein the weight of material provided to the paving machine is a summation of the determined sum value of the change in the load and the weight of material being discharged from the paving machine.

19. The paving machine of claim 14, wherein the controller is further configured to determine a density of the material based at least on a speed of the machine, an area of a ground surface being laid with the material, one or more operational parameters of the paving machine and the signal received from the load monitoring device while the material is not being delivered to the paving machine.

20. The paving machine of claim 14, wherein the load monitoring device is a radial load cell.

* * * * *